(12) United States Patent
Kismarton

(10) Patent No.: US 9,481,444 B2
(45) Date of Patent: Nov. 1, 2016

(54) PASSIVE LOAD ALLEVIATION FOR AERODYNAMIC LIFT STRUCTURES

(75) Inventor: Max U. Kismarton, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 385 days.

(21) Appl. No.: 13/611,588

(22) Filed: Sep. 12, 2012

(65) Prior Publication Data

US 2014/0070053 A1 Mar. 13, 2014

(51) Int. Cl.
*B64C 3/26* (2006.01)
*B64C 3/20* (2006.01)
*B64C 3/18* (2006.01)
*B64C 3/44* (2006.01)

(52) U.S. Cl.
CPC . *B64C 3/26* (2013.01); *B64C 3/18* (2013.01); *B64C 3/20* (2013.01); *B64C 2003/445* (2013.01); *Y02T 50/145* (2013.01)

(58) Field of Classification Search
CPC .... B64C 3/20; B64C 3/26; Y10T 428/24124
USPC ......... 244/123.1, 123.2, 123.7, 123.8, 123.9, 244/133
See application file for complete search history.

(56) References Cited

U.S. PATENT DOCUMENTS

| | | | |
|---|---|---|---|
| 4,479,620 A | 10/1984 | Rogers et al. | |
| 4,749,155 A * | 6/1988 | Hammer et al. | 244/123.7 |
| 6,419,187 B1 | 7/2002 | Buter | |
| 6,513,757 B1 * | 2/2003 | Amaoka et al. | 244/123.7 |
| 7,807,249 B2 | 10/2010 | Kismarton | |
| 2002/0028332 A1 * | 3/2002 | Pratt | A01K 87/00 428/364 |
| 2009/0321558 A1 | 12/2009 | Pitt et al. | |
| 2010/0051755 A1 * | 3/2010 | Nichols et al. | 244/45 R |
| 2010/0320320 A1 * | 12/2010 | Kismarton | B29C 43/24 244/119 |
| 2012/0177872 A1 * | 7/2012 | Tsai | B29C 70/202 428/113 |

OTHER PUBLICATIONS

Tsai, Stephen, "Improving laminates through anisotrophy and homogenization", Sep. 1, 2011, Composites World (http://www.compositesworld.com/columns/improving-laminates-through-anisotropy-and-homogenization), pp. 1 and 2.*

Massachusetts Institute of Technology Department of Aeronautics and Astronautics, "Passive Gust Load Alleviation Through Bend-Twist Coupling of Composite Beams on Typical Commercial Airplane Wings", Jul. 23, 2012 http://dspace.mit.edu/bitstream/handle/1721.1/77111/825070829.pdf?sequence=1.*

Rohl et al., "Combined Aerodynamic and structural optimization of a high-speed civil transport wing," American Institute of Aeronautics and Astronautics, 1995.

NASA Dryden Flight Research Center, "NASA Dryden Fact Sheet—X-29," http://www.nasa.gov/centers/dryden/news/FactSheets/FS-008-DFRC.html.

"Grumman X-29," http://en.wikipedia.org/wiki/X-29.

Garfinkel et al., "Intrisically-Smart Coupled Box Beams," www.pages.drexel.edu/~garfinkm/Spar.html.

Greenhalgh et al., "A continuous-fiber composite wing box-beam exhibiting twist-bend coupling," Composites Engineering, vol. 3, Nos. 7-8, pp. 691-697 (1991).

(Continued)

*Primary Examiner* — Nicholas McFall
(74) *Attorney, Agent, or Firm* — Hanley, Flight & Zimmerman, LLC

(57) ABSTRACT

An aerodynamic lift structure comprises unbalanced composite skin that couples twist and bending.

17 Claims, 5 Drawing Sheets

(56) References Cited

OTHER PUBLICATIONS

Patent Cooperation Treaty, "International Preliminary Report on Patentability," issued in connection with PCT patent Application No. PCT/US2013/055871, issued on Mar. 17, 2015, 6 pages.

Patent Cooperation Treaty, "Written Opinion," issued in connection with PCT Patent Application No. PCT/US2013/055871, issued on May 12, 2014, 5 pages.

Patent Cooperation Treaty, "International Search Report," issued in connection with PCT Patent Application No. PCT/US2013/055871, issued on May 12, 2014, 5 pages.

* cited by examiner

FIG. 5

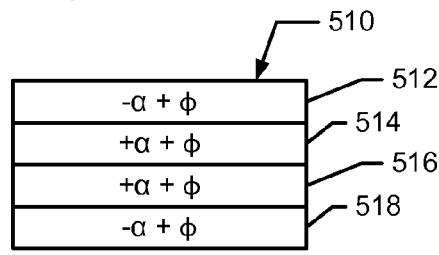

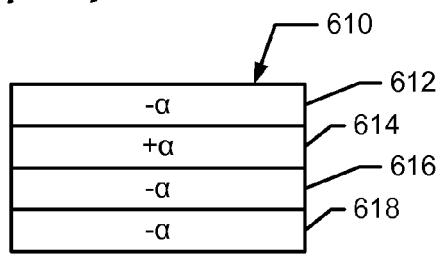

- 610
- 612: −α
- 614: +α
- 616: −α
- 618: −α

$$\begin{Bmatrix} N_x \\ N_y \\ N_{xy} \end{Bmatrix} = \sum_{k=1}^{n} \underbrace{\begin{bmatrix} \bar{Q}_{11} & \bar{Q}_{12} & \bar{Q}_{16} \\ \bar{Q}_{12} & \bar{Q}_{22} & \bar{Q}_{26} \\ \bar{Q}_{16} & \bar{Q}_{26} & \bar{Q}_{66} \end{bmatrix}_k \int_{-z_{k-1}}^{z_k} dz}_{[A]} \begin{Bmatrix} \varepsilon^o_x \\ \varepsilon^o_y \\ \gamma^o_{xy} \end{Bmatrix} + \sum_{k=1}^{n} \underbrace{\begin{bmatrix} \bar{Q}_{11} & \bar{Q}_{12} & \bar{Q}_{16} \\ \bar{Q}_{12} & \bar{Q}_{22} & \bar{Q}_{26} \\ \bar{Q}_{16} & \bar{Q}_{26} & \bar{Q}_{66} \end{bmatrix}_k \int_{-z_{k-1}}^{z_k} z\, dz}_{[B]} \begin{Bmatrix} \kappa_x \\ \kappa_y \\ \kappa_{xy} \end{Bmatrix}$$

$$\begin{Bmatrix} M_x \\ M_y \\ M_{xy} \end{Bmatrix} = \sum_{k=1}^{n} \underbrace{\begin{bmatrix} \bar{Q}_{11} & \bar{Q}_{12} & \bar{Q}_{16} \\ \bar{Q}_{12} & \bar{Q}_{22} & \bar{Q}_{26} \\ \bar{Q}_{16} & \bar{Q}_{26} & \bar{Q}_{66} \end{bmatrix}_k \int_{-z_{k-1}}^{z_k} z\, dz}_{[B]} \begin{Bmatrix} \varepsilon^o_x \\ \varepsilon^o_y \\ \gamma^o_{xy} \end{Bmatrix} + \sum_{k=1}^{n} \underbrace{\begin{bmatrix} \bar{Q}_{11} & \bar{Q}_{12} & \bar{Q}_{16} \\ \bar{Q}_{12} & \bar{Q}_{22} & \bar{Q}_{26} \\ \bar{Q}_{16} & \bar{Q}_{26} & \bar{Q}_{66} \end{bmatrix}_k \int_{-z_{k-1}}^{z_k} z^2\, dz}_{[D]} \begin{Bmatrix} \kappa_x \\ \kappa_y \\ \kappa_{xy} \end{Bmatrix}$$

FIG. 7

PASSIVE LOAD ALLEVIATION FOR AERODYNAMIC LIFT STRUCTURES

BACKGROUND

Load alleviation may be used to reduce bending moments at roots of wing boxes. Reducing the bending moments, in turn, enables wing box weight to be reduced. A reduction in wing box weight is highly desirable, as it reduces fuel costs and other aircraft operating costs.

Root bending moments may be reduced by unloading aerodynamic lift at tips of the wing boxes. Wing boxes of the Boeing 747 aircraft, for instance, are designed with a combination of high aft sweep and sufficient flexure to reduce wing tip angle of attack. Such passive load alleviation is generally lighter and less complex than active load alleviation. Active load alleviation may include actuators, flaps and other flight control mechanisms that add complexity and weight to the aircraft.

Wing boxes of certain future aircraft, however, might have lower sweep and flexure. For those future aircraft, other ways of passively reducing root bending moments are needed.

SUMMARY

According to an embodiment herein, an aerodynamic lift structure comprises unbalanced composite skin that couples twist and bending.

According to another embodiment herein, an aircraft wing box comprises skin including a laminated plate of plies of reinforcing fibers embedded in a matrix. The laminated plate is unbalanced to couple twist and bending so the wing box twists as it is flexed during aerodynamic loading.

According to another embodiment herein, a method of fabricating a wing box comprises fabricating unbalanced composite skin that couples twist and bending to provide passive load alleviation.

These features and functions may be achieved independently in various embodiments or may be combined in other embodiments. Further details of the embodiments can be seen with reference to the following description and drawings.

BRIEF DESCRIPTION OF THE DRAWINGS

FIGS. 5 and 6 are illustrations of unbalanced laminated plates.

FIG. 7 is an illustration of an [A] [B] [D] matrix for a laminated plate.

DETAILED DESCRIPTION

Figure 1A:
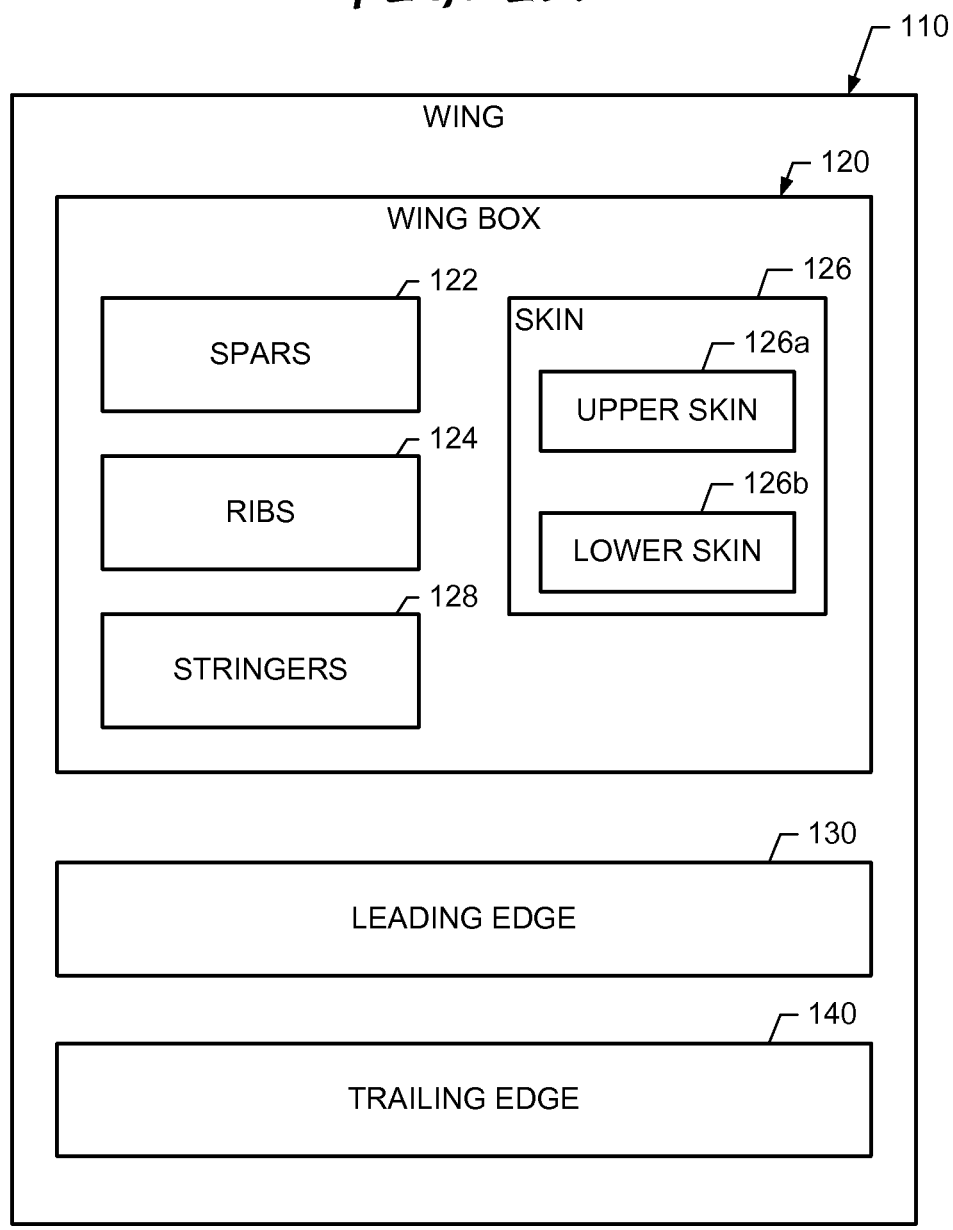
FIG. 1A is a functional box diagram of an aircraft wing.

Reference is made to FIG. 1A, which illustrates an aircraft wing 110 for a commercial aircraft. The wing 110 includes a wing box 120, a leading edge 130, and a trailing edge 140. The wing box 120 includes spars 122 (e.g., a front spar and a rear spar), and a plurality of ribs 124 between the spars 122. The spars 122 extend in a spanwise direction, and the ribs 124 extend in a chordwise direction.

The wing box 120 may have a multi-spar or multi-rib configuration. The multi-rib configuration is preferred for commercial aircraft having long wing aspect ratios. In some embodiments, aspect ratio of the wing box 120 is greater than 3:1. In some embodiments, the aspect ratio of the wing box 120 is greater than 4:1.

The wing box 120 further includes skin 126 covering the spars 122 and ribs 124. The skin 126 may include upper skin 126a and lower skin 126b. In some embodiments, skin gages may be 0.3 to 0.8 inches thick.

The wing box 120 may further include stringers 128 that perform functions including, but not limited to, stiffening the skin 126. The stringers 128 may also extend in a spanwise direction.

Figure 1B:
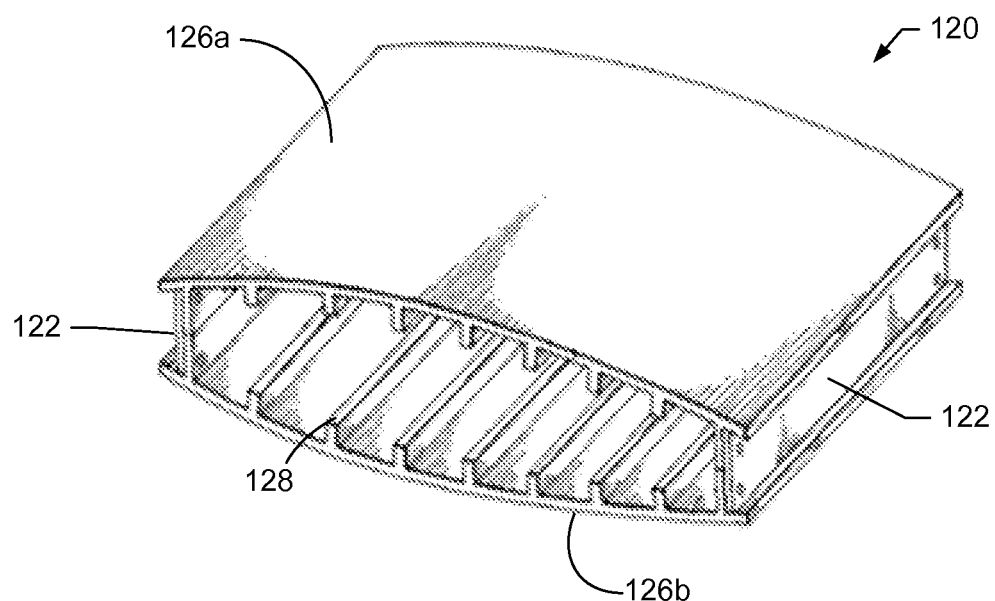
FIG. 1B is an illustration of an aircraft wing box construction.

FIG. 1B shows an example of a wing box 120. Spars 122, stringers 128, and upper and lower skins 126a and 126b are shown. Ribs 124 are not shown. The spars 122 may be connected to the skins 126a and 126b to form a substantially uninterrupted volume between the two skins 126a and 126b.

In some embodiments, the wing 110 may include a single wing box 120. In other embodiments, the wing 110 may include more than one wing box.

The spars 122, ribs 124, and stringers 128 may be made of metal or balanced composite materials. The spars 122 may be configured as beams having caps and webs.

For load factors of 1-g during cruise and higher load factors (e.g., up to 3.75-g), bending loads in the wing box 120 are dominant. The bending loads include compression loads in the upper skin 126a, tension loads in the lower skin 126b, and shear loads in webs of the spars 122. Tension and compression strains are typically 0.003 to 0.005 for commercial aircraft. Strains in the chordwise and shear directions are substantially smaller and are not dominant.

Figure 2:
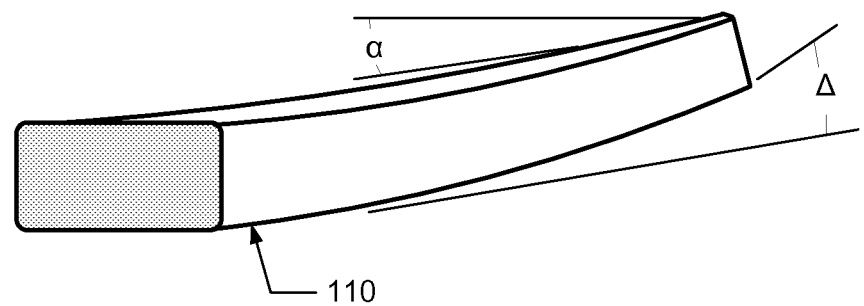
FIG. 2 is an illustration of a wing box that couples twist and bending.

Additional reference is made to FIG. 2. The skin 126 includes one or more laminated plates of unbalanced composite material. The composite skin 126 is unbalanced so as to couple twist and bending.

Consequently, as the wing box 120 bends during flight, it may also twist. The twist angle is denoted by $\alpha$, and the bend angle is denoted by $\Delta$. Coupling is defined as $d\alpha/d\Delta$.

In some embodiments, the wing box 120 is configured to twist 1-10 degrees at the tip to reduce wing tip angle of attack as the wing box 120 bends under maximum loading. Such twisting alleviates root bending moment of the wing box 120. Moreover, in aft swept wings, wing box deformation reduces the load.

The skin 126 advantageously alleviates loads on wings 110 having a relatively low sweep and flexure. Low sweep may be characterized as a quarter chord line angle between −10 and 45 degrees.

Among the benefits of passive load alleviation as described herein, fewer materials may be used within the wing box 120 to achieve similar flight loads, thereby lowering aircraft weight and improving aircraft efficiency.

Figure 3:
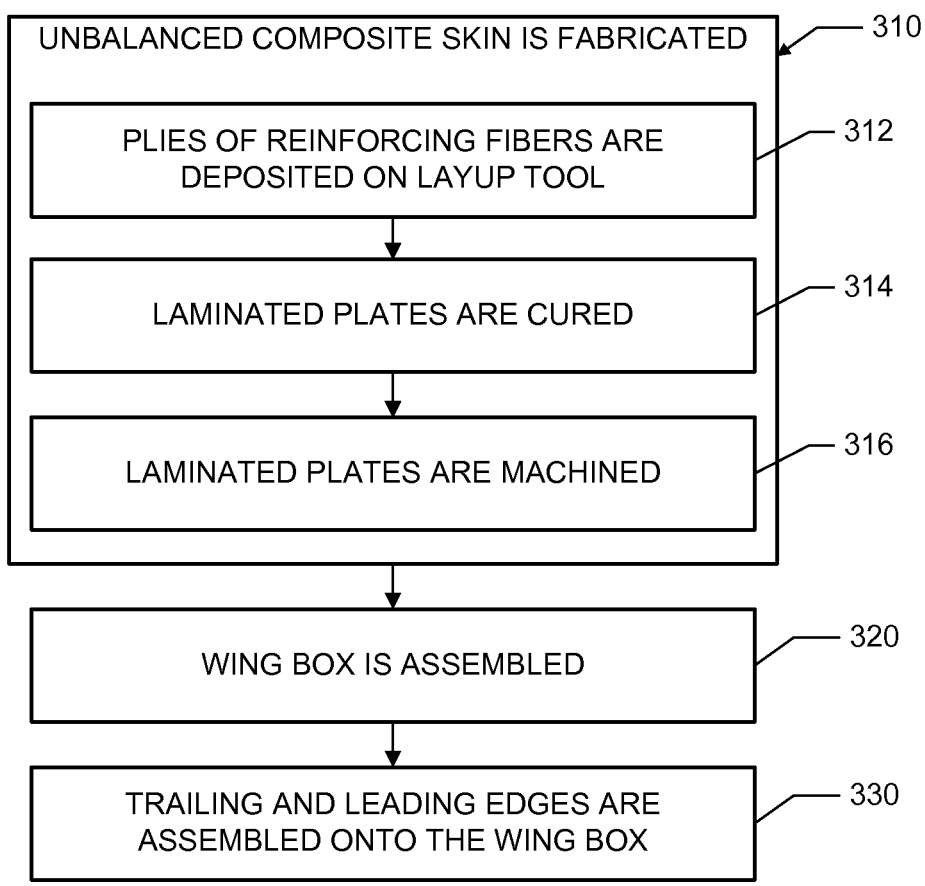
FIG. 3 is an illustration of a method of fabricating a wing including a wing box having composite skin that couples twisting and bending.

Reference is now made to FIG. 3, which illustrates a method of fabricating an aircraft wing with unbalanced composite skin that couples twist and bending. At block 310, the unbalanced composite skin is fabricated. The composite skin may include one or more laminated plates. In some embodiments, the skin may include upper skin (which may be fabricated as one or more laminated plates of unbalanced plies of reinforcing fibers embedded in a matrix), and lower skin (which may be fabricated as one or more laminated plates of unbalanced plies of reinforcing fibers embedded in a matrix). Some of the plates may have different coupling than other plates. In other embodiments, one of the upper and lower skin is unbalanced while the other is balanced.

The reinforcing fibers and matrix are not limited to any particular composition. Examples for the reinforcing fibers include, but are not limited to, carbon, fiberglass, Kevlar, boron, and titanium. Examples for the matrix include, but are not limited to, plastic and metal. As a first example, carbon fibers are embedded in a plastic matrix. As a second example, carbon fibers are embedded in a titanium matrix.

Each laminated plate may be fabricated as follows. At block 312, plies of reinforcing fibers are deposited on a layup tool (e.g., a mandrel or mold tool). The reinforcing fibers may be impregnated with resin before or after layup. The fibers are oriented so that the laminated plate is unbalanced to couple twist and bending.

At block 314, the laminated plate is cured. At block 316, the laminated plate is machined. For example, fastener holes or other types of openings may be drilled or cut into the skin panel, the skin panel may be cut to shape, etc.

In some embodiments, stiffeners may be formed integrally with the composite skin. For instance, the layup tool has trenches for forming stringers. Reinforcing fibers for the stringers are deposited in the trenches, and then reinforcing fibers for the skin are deposited on the layup tool over the stringers. The skin and stringers are then co-cured.

At block 320, the skin is assembled on a stiffening substructure to form a wing box. For instance, the spars and ribs of the stiffening substructure are fastened together, and then upper and lower skin panels are fastened to the stiffening substructure.

At block 330, trailing and leading edges are assembled onto the wing box. The trailing and leading edges include fixed and moving elements. For instance, moving elements of the trailing edge include ailerons, spoilers and flaps; and moving elements of the leading edge include leading edge flaps.

Two examples of unbalanced laminated plates will be described with reference to FIGS. 5 and 6. First, however, a balanced laminated plate will be described.

Figure 4:
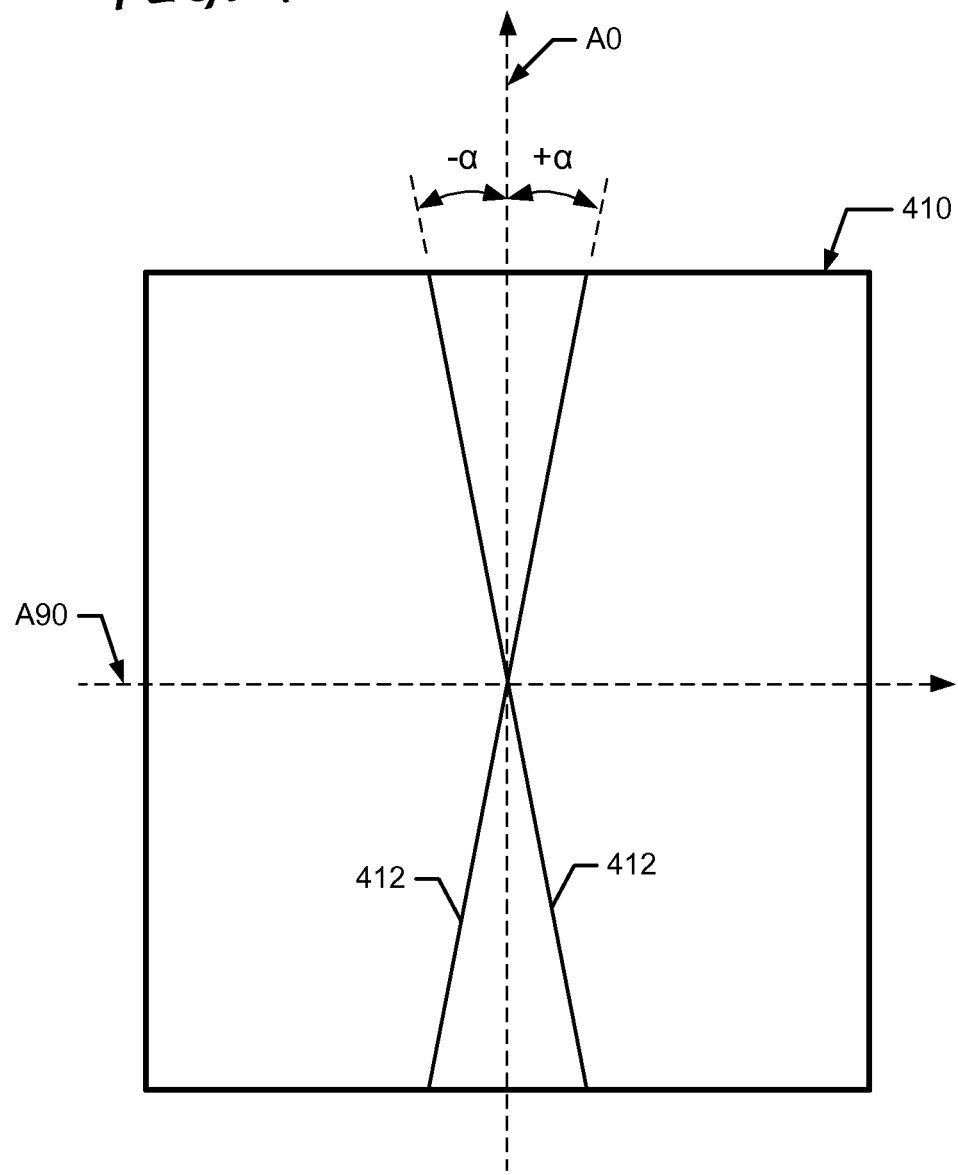
FIG. 4 is an illustration of a balanced laminated plate.

Reference is made to FIG. 4, which illustrates a balanced laminated plate 410. A rosette for the plate 410 is defined in dashed lines by a first arrow A0 for 0 degree plies and a second arrow A90 for 90 degree plies. The balanced laminated plate includes plies of fibers 412 at angles $+\alpha$ and $-\alpha$ with respect to the rosette. In some embodiments, $\alpha$ is zero degrees for maximum transfer of bending loads. In other embodiments, $\alpha$ is between 2 and 12 degrees for suppression or delay of ply splitting.

The laminated plate 412 may also include plies of fibers at other angles, such as $+\beta$ and $-\beta$ (not shown) with respect to the rosette. As a first example, additional reinforcing fibers are oriented at a conventional 45 degrees and 90 degrees. As a second example, additional reinforcing fibers are oriented at $\pm\beta$, where $\beta$ is between 50 and 85 degrees (e.g., $\pm 55$, $\pm 60$, $\pm 65$, $\pm 70$, $\pm 75$). In some embodiments, plies of the fibers oriented at $\pm\beta$ may be interspersed with plies of the fibers oriented at $\pm\alpha$.

In some embodiments, each ply may be a unidirectional tape with fibers oriented in a single direction. In other embodiments, each ply may be a weave having fibers oriented in more than one direction. For instance, a weave may have some fibers oriented at $+\alpha$ and others oriented at $-\alpha$.

In some embodiments, plies above a mid-plane of the laminated plate may be a mirror image of those below the mid-plane (that is, the laminated plate is symmetric). In other embodiments, the laminated plate may have plies above its mid-plane in a different orientation than plies below its mid-plane (that is, the laminated plate is non-symmetric).

FIG. 5 illustrates a first basic example of an unbalanced laminated plate 510 that couples twist and bending. The laminated plate 510 is unbalanced by orienting the reinforcing fibers in each ply 512-518 according to a rosette that is skewed by an angle $\phi$ between −25 to 10 degrees. In some embodiments, the angle $\phi$ may be between 1 and 10 degrees, which lessen the effects on stiffness and strength properties. Plies of the laminated plate 510 of FIG. 5 have the following fiber orientations: $[-\alpha+\phi, +\alpha+\phi, +\alpha+\phi, 1\alpha+\phi]s$, where the term "s" represents symmetry.

Consider another example. A balanced laminated plate has the following plies [45,90,−45,0,0,45,0,0,−45,0,0,45,0, 0,−45,0,0,]s. Skewing the rosette by 2 degrees produces an unbalanced laminated plate whose plies have the following fiber orientations: [47,92,−43,2,2,47,2,2,−43,2,2,47,2,2,−43, 2,2,]s.

FIG. 6 illustrates a second basic example of an unbalanced laminated plate 610 that couples twist and bending. The laminated plate 610 includes four plies 612-614. A subset of fibers oriented at a given angle in a balanced structure is replaced with fibers having the same angle but different sign. In this second example, the reinforcing fibers of the third ply 616 are oriented at an angle of $-\alpha$ instead of $+\alpha$.

Consider another example. A balanced laminated plate includes the following plies [45,90,−45,0,0,45, 0,0,−45,0,0,45,0,0,−45,0,0,]s. Substituting the 45 degree fibers in the ninth ply with −45 degree fibers produces an unbalanced laminated plate having the following plies: [45,90,−45,0,0,45,0,0,45,0,0,45,0,0,−45,0,0,]s.

An unbalanced laminated plate herein is not limited to these examples. Although FIGS. 5 and 6 show laminated plates 510 and 610 each with four plies, a laminated plate herein is not so limited. Other embodiments of a laminated plate herein may have other numbers of plies.

The magnitude of the coupling may be controlled by using other configurations of fiber angles.

The magnitude of the coupling may be controlled in ways other than selection of fiber angles. The magnitude of the coupling may be controlled by selection of fiber stiffness, number of fibers per ply, number of plies per plate, etc. For instance, fibers in unbalanced laminated plates may have different stiffness in different orientations.

Reference is now made to FIG. 7, which illustrates an [A] [B] [D] matrix for computing resultant forces $\{N_x, N_y, N_{xy}\}$ and bending moments $\{M_x, M_y, M_{xy}\}$ in a laminated plate. The term $\overline{Q}_{16}$ in the B matrix represents the coupling between twist and bending. The [A] [B] [D] matrix may be used to compute resultant forces and bending moments in a composite laminated plate having plies of reinforcing fibers embedded in a matrix. For such a composite laminated plate, the term $\overline{Q}_{16}$ may be controlled by selection of fiber angle, fiber stiffness, number of fibers per ply, number of plies per plate, etc.

Composite laminated plates herein may be used for aircraft skin panels having solid laminate construction. Composite laminated plates herein may also be used for face sheets in sandwich (e.g., honeycomb) skin panels.

An aerodynamic lift structure herein is not limited to an aircraft wing box. Other long, slender structures having skin that couples twist and bending includes, without limitation, blades of wind turbines, sailboat wings and propellers.

The invention claimed is:

1. An apparatus comprising:
a laminated plate of an aerodynamic lift structure including:
a matrix; and
plies of reinforcing fibers embedded in the matrix, wherein the reinforcing fibers are oriented at different angles between the plies, the angles of the fibers defined by adding a positive or a negative value of a fiber orientation angle from a rosette to a skew angle value to define an unbalanced ply structure of the laminated plate.

2. The apparatus as defined in claim 1, wherein the reinforcing fibers include one or more of carbon, fiberglass, Kevlar, boron or titanium.

3. The apparatus as defined in claim 1, wherein a layered stacking arrangement of the plies defines the unbalanced ply structure.

4. The apparatus as defined in claim 1, wherein the reinforcing fibers of the plies are angled by −25 degrees to 10 degrees relative to the rosette.

5. The apparatus as defined in claim 1, wherein the reinforcing fibers of the plies are angled by 1 degree to 10 degrees relative to the rosette.

6. An aerodynamic structure comprising:
an aircraft skin including:
a plurality of laminated plates, the laminated plates comprising plies of reinforcing fibers that define an unbalanced structure of the aircraft skin, the unbalanced structure defined by orientations of the reinforcing fibers at different angles between the plies, the angles of the fibers defined by adding a positive or a negative value of a fiber orientation angle from a rosette to a skew angle value.

7. The aerodynamic structure as defined in claim 6, wherein the reinforcing fibers include one or more of carbon, fiberglass, Kevlar, boron or titanium.

8. The aerodynamic structure as defined in claim 6, wherein a layered stacking arrangement of the plies defines the unbalanced structure.

9. The aerodynamic structure as defined in claim 6, wherein the reinforcing fibers of the plies are angled by −25 degrees to 10 degrees relative to the rosette.

10. The aerodynamic structure as defined in claim 6, wherein the reinforcing fibers of the plies are angled by 1 degree to 10 degrees relative to the rosette.

11. A method comprising:
assembling plies of reinforcing fibers together for an aircraft skin, wherein the reinforcing fibers are oriented at different angles between the plies, the angles of the fibers defined by adding a positive or a negative value of a fiber orientation angle from a rosette to a skew angle value to define an unbalanced ply structure of the aircraft skin.

12. The method as defined in claim 11, further including fabricating the plies of reinforcing fibers into a laminated plate of the aircraft skin.

13. The method as defined in claim 11, wherein assembling the plies includes placing the plies into a matrix to define a laminated plate of the aircraft skin.

14. The method as defined in claim 11, wherein the reinforcing fibers include one or more of carbon, fiberglass, Kevlar, boron or titanium.

15. The method as defined in claim 11, wherein a layered stacking arrangement of the plies defines the unbalanced ply structure.

16. The method as defined in claim 11, wherein the reinforcing fibers of the plies are angled by −25 degrees to 10 degrees relative to the rosette.

17. The method as defined in claim 11, wherein the reinforcing fibers of the plies are angled by 1 degree to 10 degrees relative to the rosette.

* * * * *